United States Patent [19]
Van Buul

[11] Patent Number: 4,745,366
[45] Date of Patent: May 17, 1988

[54] SIGNAL PROCESSING ARRANGEMENT

[75] Inventor: Marinus C. W. Van Buul, Breda, Netherlands

[73] Assignee: U.S. Philips Corporation, New York, N.Y.

[21] Appl. No.: 916,356

[22] Filed: Oct. 8, 1986

[30] Foreign Application Priority Data

Oct. 14, 1985 [NL] Netherlands ......................... 8502800

[51] Int. Cl.$^4$ .......................... H03K 5/22; H03M 1/06
[52] U.S. Cl. ..................................... 328/159; 307/529; 382/34
[58] Field of Search ................. 328/159, 158; 307/359, 307/262, 529; 382/34

[56] References Cited

U.S. PATENT DOCUMENTS 3,631,352 12/1971 Kelley et al. .................... 307/359 X
3,735,273 5/1973 Wright et al. .................... 328/159 X
4,602,374 7/1986 Nakamura et al. ............. 307/359 X

FOREIGN PATENT DOCUMENTS 0103720 6/1985 Japan .................................... 307/359

OTHER PUBLICATIONS

"Temporal Filtering Using Pixel Incrementing" by Harro Bruggeman, Smpte Journal, Aug. 1981, pp. 686–694.

Primary Examiner—John S. Heyman
Attorney, Agent, or Firm—Thomas A. Briody; Jack E. Haken; Anne E. Barschall

[57] ABSTRACT

In, more specifically, image-processing systems in which images must be stored in a memory (4) of a signal processing arrangement (1) for differential encoding, the memory capacity required is very large. It is possible to save memory capacity by using a square-wave signal generator (12) generating a bit sequence which provides the predictable information which was previously stored in the least significant bit position in the memory (4).

8 Claims, 1 Drawing Sheet

SIGNAL PROCESSING ARRANGEMENT

BACKGROUND OF THE INVENTION

1. Field of the Invention

The invention relates to a signal processing arrangement, comprising a comparator circuit, a summing arrangement and a memory connected to the summing arrangement. The comparator has a first signal input for receiving an input signal and a second signal input. The summing arrangement has a third signal input connected to the comparator circuit and a fourth signal input. The memory is connected to the second signal input of the comparator circuit and to the fourth signal input of the summing arrangement.

2. The Prior Art

Such a signal processing arrangement which is, for example, used as a modulator in inter alia imageprocessing apparatus such as TV cameras, is disclosed in an article by H. Bruggeman, "Temporal Filtering Using Pixel Incrementing" published in the Society of Motion Pictures and Television Engineers (SMPTE) Journal, pages 686–694, August 1981.

In that arrangement, a comparator circuit compares the amplitudes of an analog video signal and of a prediction signal, produced by an n bit D/A converter. In doing so the sign of a differential signal which is applied to a summing arrangement is determined. An increment control arrangement and a digital memory containing n bits in each memory location, are further coupled to the summing arrangement. An m bit number stored in the memory is applied to the summing arrangement and added together with the differential signal and an increment signal determined by the increment controller in accordance with a predetermined algorithm, and is returned to the memory. From the n bit number read from the memory n bit m≧n are applied to the n-bit D/A converter for forming the prediction signal.

That signal processing arrangement has the disadvantage that when used in image-processing equipment, more specifically if a complete picture must be stored, the memory required therefor is very bulky.

SUMMARY OF THE INVENTION

The invention has for its object to reduce the number of bits required per memory location of the memory. According to the invention, the signal processing arrangement includes a square-wave signal generator which is coupled to the summing arrangement and is connected to the least significant bit input of the second signal input of the comparator circuit for generating a bit sequence which represents the least significant bits of the signals to be applied to the comparator circuit.

The invention has the advantage that, whereas the quantization noise remains the same, the efficiency of the memory is increased, as the memory according to the invention does not contain bits whose content is predictable. As a result thereof the size of the required memory can be reduced by the same number of bits as there are memory locations.

A first preferred embodiment of the signal processing arrangement according to the invention, in which the comparator circuit is arranged for producing a binary signal whose value depends on the sign of the differential signal between the signals applied to the first and second signal inputs of the comparator circuit, is characterized in that the least significant bit input of the fourth signal input of the summing arrangement is connected to the squarewave signal generator. Advantageously, the signal processing arrangement can be provided with an increment control for realising a, in principle variable, step size.

A second preferred embodiment of the signal processing arrangement according to the invention, is characterized in that the comparator circuit is arranged for producing a trivalent signal whose value depends on both the sign of the differential signal between the signals applied to the first and second signal inputs of the comparator circuit and on the value of the bit sequence produced by the square-wave signal generator.

A further advantage is that the arrangement includes a summing arrangement in which the number of required bit inputs is reduced by one.

BRIEF DESCRIPTION OF THE DRAWINGS

The invention and its advantages will now be described in greater detail by way of example with reference to the accompanying drawings, in which corresponding reference numerals denote corresponding elements. Therein.

DETAILED DESCRIPTION OF THE PREFERRED EMBODIMENT

Figure 1:
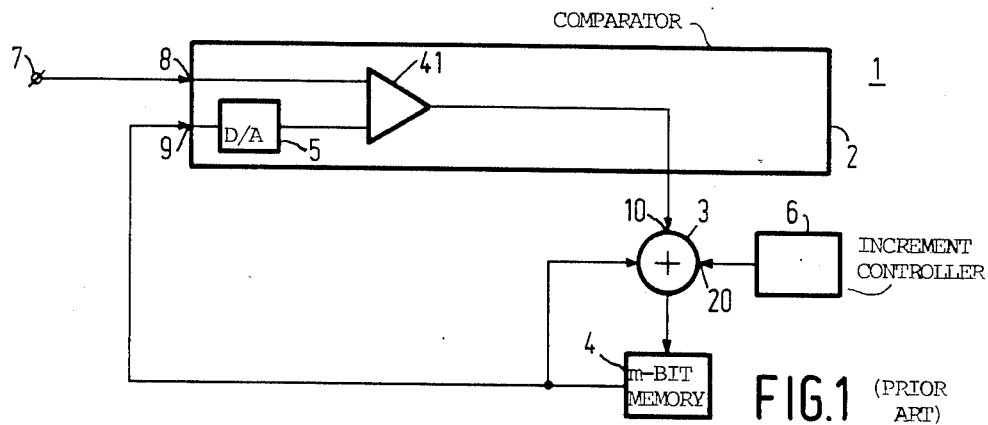
FIG. 1 is a block circuit diagram of a prior art signal processing arrangement.

The basic circuit diagram of FIG. 1 shows a signal processing arrangement 1 which is inter alia suitable for use in telecommunication or speech systems, or in sound or image-processing equipment such as displays and TV cameras. As will be described in greater detail hereinafter, the arrangement 1 may further be used in delta modulation, pulse code modulation, differential pulse code modulation or as an A/D converter.

The arrangement 1 comprises a comparator circuit 2, a summing arrangement 3, an m bit memory 4 assembled from memory locations containing m bits per memory location, an n bit D/A converter 5 which in the drawing is included in the comparator circuit 2 and, if desired, an increment controller 6. An input signal, for example a video signal, is connectable to an input terminal 7, which signal is applied to a first signal input 8 of the comparator circuit 2. The memory 4 contains memory locations each comprising m bits. The number of memory locations depends on, for example, image processing equipment inter alia on the fact whether it must be possible to store one or more pictures, fields or lines in the memory 4. An image comprises fields, a field comprises lines and a line comprises a plurality of picture elements. Each picture element has a certain grey level which is represented by an m bit number, which number can be stored in a memory location and be read. The memory 4 is connected by means of m bits via a second signal input 9 of the comparator circuit 2 to the D/A converter 5. Generally, m≧n, the n most significant bits of the n bits of the memory 4 being connected to the D/A- converter 5. The memory 4 and the summing arrangement 3 are connected as a digital integrator. A signal applied to the second signal input 9 forms the representation of a number read at a given moment from a memory location of the memory 4. The amplitudes of the input signal and the D/A converted signal are compared in an analog comparator 41 and the result thereof is applied as a differential signal to a third signal input 10 of the summing arrangement 3 connected to the comparator circuit 2. In the arrangement shown in FIG. 2, the differential signal has a binary step size with the arithmetic values plus or minus "1", in FIG. 3 the differential signal has a tri-valent step size with arithmetic values plus or minus "1" and "zero", as will be explained in detail hereinafter.

The value of a number read from a memory location of the memory 4 is added in the summing arrangement to the value of the differential signal at the signal input 10 and the result is returned to the memory 4.

If the video signal is applied to the first signal input 8, the arrangement 1 is operated at a frequency which is in synchronism with the picture elements of the video signal, using means not further shown in the drawing. Thus, the memory 4 will, when it has an adequate memory capacity, be completely filled with a first image in one cycle in an image period of T sec. This image is still only a rough approximation of the image applied to the input terminal 7 as generally the value of the number representing the grey level of each picture element cannot be approached with a sufficient accuracy in one single cycle with a predetermined step size of the differential signal. More cycles are necessary for that purpose, whereafter the memory 4 contains the pulse code-modulated value of the video signal.

The increment controller 6, which by means of a variable step size provides the arrangement 1 with an adaptive mode of operation is disclosed in said article by H. Bruggeman, is connected to the summing arrangement 3. The ultimate step size is then formed by adding the differential signal to an increment number applied by the increment controller 6 to the summing arrangement 3 via an input 20. The adaptive operation is based on the fact that the value of the increment number is variable and is adapted to the extent in which the signals at the outputs 8, 9 differ from each other. This accomplishes that the memory 4 contains, in a smaller number of cycles and with a faster converging rate than previously, a sufficiently accurate pulse code modulated value of the image.

In practice, high-rate picture systems are used having $512 \times 512$ picture elements, each picture element being drivable at, for example, 256 grey levels, which requires $m = 8$ bits per memory location. The required memory space for one picture then amounts to 2 M bits ($= 2^{21}$ bits).

To what extent the required memory capacity must be limited the recognition that the memory 4 contains bits whose information content is predictable plays an important role. That a portion of the information content present in the memory 4 is predictable will be obvious from the fact that if always only an odd number is added or subtracted, the least significant bit in the binary representation thereof has, after each addition or subtraction, a bit sequence with alternate zeroes and ones. Briefly: an odd number added to or subtracted from an even number renders the even number odd; likewise, odd plus or minus odd results in an even number.

Figure 2:
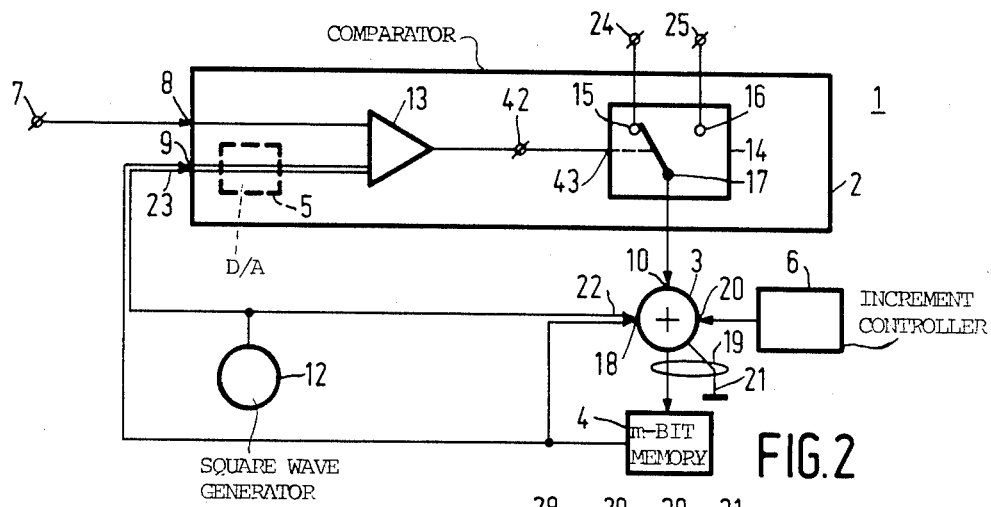
FIG. 2 shows a first preferred embodiment of the signal processing arrangement according to the invention and FIG. 3 shows a second preferred embodiment of the signal processing arrangement according to the invention.
Figure 3:
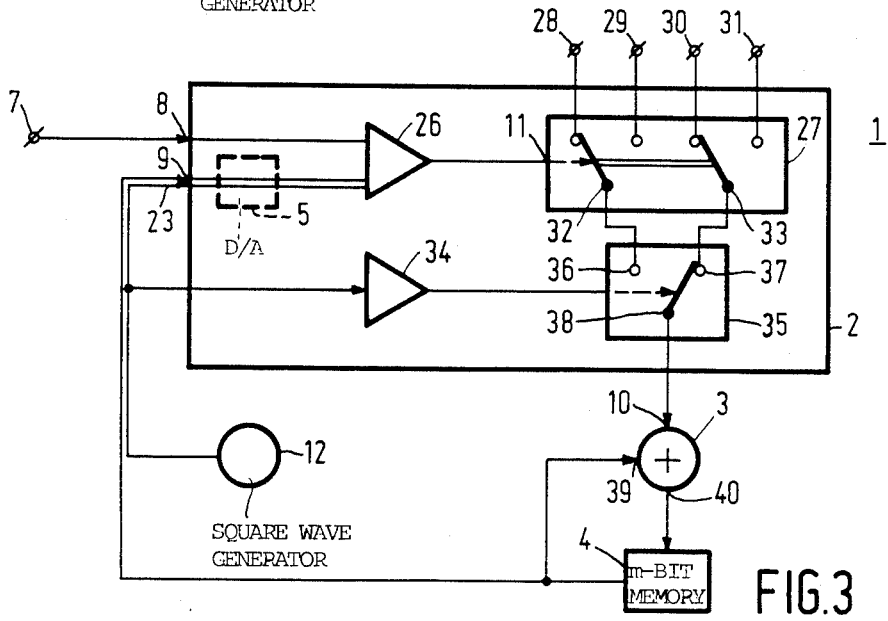

Bits having a predictable content can be avoided by reducing the memory 4 by a corresponding number of bits and to generate the predictable information content with the aid of a square-wave generator 12, as is shown in FIGS. 2 and 3. In the further course of this description the number of bits (m) per memory location of the memory 4 is chosen one less than the number of bits (n) of the second signal input 9; so $m = n - 1$. The predictable information content of the least significant $n^{th}$ bit is in this situation generated by the square-wave generator 12 and applied to the least significant bit input 23 of the second signal input 9 of the comparator circuit 2.

Both an analog and a digital input signal are connectable to the input terminal 7. If an analog input signal is connected to terminal 7 then the signal applied to the second signal input 9 can, for example, be further processed by means of the D/A converter 5, which is shown in the comparator circuit 2 by means of dotted lines, in the comparator circuit 2 which must then be constituted by an analog comparator. If a digital input signal is connected to terminal 7, the D/A converter 5 can be omitted, the comparator circuit must then be implemented as a digital comparator circuit.

In this embodiment the comparator circuit 2 includes a change-over switch 14 which is drivable by means of a differential amplifier 13 via a control input 43 and has switching contacts 15, 16 and a master contact 17, which can, for example, be of an electronic implementation. The summing arrangement 33, arranged as an n-bit adder, further has an n bit fourth signal input 18, an output 19 and, optionally, an input 20 for the connection of an increment controller 6. The output 19 is an n-bit output whose $n - 1$ most significant bits are connected to the memory 4. As strictly speaking it may be omitted, the least significant bit output 21 is not connected. The square-wave generator 12 is connected to the least significant bit input 22 of the fourth signal input 18. The switching contacts 15, 16 are connected to terminals 24, 26, which are connected to signals having opposite arithmetic values plus "1" and minus "1" relatively.

The arrangement 1 operates as follows. At the start of the first cycle, the memory 4 is completely filled with "zeroes". The first $(n-1)$ bit number, still consisting exclusively of "zeroes", are read from the memory 4. The square-wave signal generator 12 generates during the first cycle which, as have all the subsequent cycles, has a duration of T sec., then $n^{th}$ least significant bits, designated LSB in the sequel. The LSB has for example, during the total overal first cycle, a value "zero", during the second cycle a value "one", during the third cycle a value "zero" etc. The periodicity of the sequence of LSB's is consequently 2T. The LSB is completed by the read $n - 1$ bit number. The sign of the differential signal at terminal 42, which is based on the difference between the grey level of a first picture element and the number read from the memory 4, determines whether from the change-over switch 14 a signal having a value plus "one", in the case of a positive sign, or minus "one", in the case of a negative sign, is applied to input 10 of the summing arrangement 3. This modulation principle by means of differential encoding at two step sizes is generally known as delta modulation and, when a plurality of step sizes is used, is known as differential pulse code modulation. If the sign relating to said first number is positive, a "one" is applied to input 10, and the first number consisting of $n-1$ ""zero's", completed with the LSB which has also "zero" value, is applied to the input 18. After these numbers have been added together, the $n-1$ most significant bits, all "zero's", from the resultant binary n-bit number having a value "one" at output 19, are reentered in the appropriate first memory location, for example the memory location from which the first number has been read. Thereafter a second number is read from a second memory location and, after having been compared with the amplitude of a second picture element and after the summing operation, a second number is re-entered in a second memory location in the memory 4.

Acting thus, all picture elements of the image are processed in the first cycle, a first approximate image being stored in the memory 4 after T sec.

At the beginning of the second cycle the LSB changes its sign and remains in the "one" state 4 after T sec.

At the beginning of the second cycle the LSB changes its sign and remains in the "one" state for T sec. The number of the first memory location, consisting of "zeros", is read from the memory 4 and is completed with the LSB having the value "one". Let it be assumed that thereafter, after comparing the sign of the difference is again positive. Then a "one" is applied to input 10 of the summing arrangement 3, a "one" to input 22 and "zeros" to the remaining n−1 bit inputs of input 18. After the adding operation, the least significant bit of the n−1 bit number which is entered into the memory 4 is "one". Thereafter said second number containing n−1 "zeros" is read from the memory 4. Let it now be assumed that the sign of the difference is negative. Then, via the changeover switch 14, a minus "one" is applied to input 10 of the summing arrangement 3, a "one" to input 22 and "zeros" to the remaining n−1 bit inputs of input 18. After the adding operation n−1 "zeros" remain, which are returned to the memory 4. In the same manner all the picture elements of the image are processed in this second cycle.

Then the third cycle follows in which the square-wave generator 12 generates a LSB of the value "zero". After an appropriate number of cycles, the memory 4 contains the image in the digitized pulse code-modulated form which is available for further processing.

When the arrangement 1 is used in said high-rate picture systems, a savings in costprice and in memory capacity is realised; this savings in memory capacity is $1 \times 512 \times 512 = 267$ Kbit ($2^{18}$ bit).

It is advantageous that the use of the increment controller 6 in this first embodiment is also possible if this controller applies a variable but even increment number to the summing arrangement 3. So, for example, if the increment controller 6 generates increment numbers in accordance with a given algorithm having values which are powers of 2, for example $+2, +2^2, +2^3 \ldots$ Namely said ultimate step size then remains odd, as the odd difference signal (plus or minus "one") added to the even increment number remains odd. Consequently also in this case the predictable least significant bit sequence can be generated by a square-wave generator 12.

FIG. 3 shows a second embodiment of the arrangement 1.

In this Figure the comparator circuit 2 comprises a controllable dual change-over switch 27 coupled to a differential amplifier 26, which change-over switch has a common control input 11 and also switching contacts connected sequentially to terminals 28, 29, 30 and 31, two master contacts 32, 33 and a single change-over switch 35 which is controllable by a differential amplifier 34 and has switching contacts 36 and 37 and a master contact 38, which can all be of an electronic implementation.

Advantageously, the arrangement 1 in this second embodiment includes a summing arrangement 3 which is arranged as a n−1 bit adder, having a n−1 bit input 39 and an n−1 bit output 40.

The square-wave generator 12 is coupled to the summing arrangement via the differential amplifier 34 and the change-over switch 35.

In all other respects the arrangement 1 is identical to the arrangement shown in FIG. 1.

Signals having respective arithmetical values "one", "zero", "zero" and minus "one" are connected to the terminals 28, 29, 30 and 31. In a first position of the dual change-over switch 27, the master contacts 32 and 33 are connected to the switching contacts 28 and 30, respectively and in the second position these master contacts are connected to the respective switching contacts 29 and 31. The master contacts 32, 33 are connected to the respective switching contacts 36 and 37 of the change-over switch 35. The master contact 38 of change-over switch 35 is connected to the signal input 10 of the adder arrangement 3. In this embodiment the arrangement 1 operates as follows. The first cycle starts by reading a n−1 bit number from a memory 4 which is filled with "zeros". During this cycle the LSB of the square-wave generator 12 is "zero". The position of the change-over switch 27 is determined by the sign of the difference between the value of the number applied to signal input 9 and the value of a first picture element of the video signal applied to input terminal 7. Let it be assumed that the sign of the difference is positive, so that the change-over switch 27 is in the position shown, and that the shown position of the change-over switch 35 is associated with an LSB having the value "zero". In that case the signal connected to terminal 30 and having a value "zero" is switched-through and applied to input 10 of the summing arrangement 3. Then an n−1 bit number all the bits of which have the value "zero" are removed from the memory 4. Acting thus all the picture elements are processed in the first cycle.

In the second cycle the LSB is "one", so that the change-over switch 35 is in the position not shown. Now a number having a value "one" is applied to signal input 9, whereafter the sign of said difference is determined.

Let it be assumed that the sign is positive. Then the change-over switch 27 stays in the position shown and the signal connected to terminal 28 and having the value "one" is applied to summing arrangement 3, is added to the number read from memory 4 and returned to the memory.

If the sign is negative, the change-over switch 27 moves to the position not shown so that the signal connected to terminal 29 and having value "zero" is applied to the summing arrangement 3, the result of summing the number read from memory 4 being returned to the memory 4.

In said last position of the change-over switch 27, so in the event of a negative sign and the change-over switch 35 being in the position shown, a signal having the value minus "one" is applied to the summing arrangement 3 and further processed in the manner described in the foregoing.

In this embodiment the arrangement 1 also contains the digitized value of the video signal and is consequently suitable for use as an A/D converter in both pulse code modulation or differential pulse code modulation-The principle described and illustrated in the foregoing is in its generality both suitable for use in said modes of modulation and for demodulation, the advantages already described being preserved.

What is claimed is:

1. A signal processing arrangement, comprising:
   a. a comparator circuit having a first signal input for receiving an input signal, a second signal input, and an output, the second signal input having a least significant bit input;
   b. a summing arrangement having a first signal input connected to the output of the comparator circuit and a second signal input;
   c. a memory having an output connected to the second signal input of the summing arrangement and to the second signal input of the comparator circuit; and
   d. a square-wave generator having an output coupled to the summing arrangement and to the least significant bit input of the second signal input of the comparator circuit, the square wave generator generating a bit sequence which represents the least significant bits of signals applied to the comparator circuit.

2. The signal processing arrangement of claim 1 wherein:
   a. the comparator circuit provides at its output a binary signal having a value which depends on a sign of a difference between the signals applied to the first and second signal inputs of the comparator circuit; and
   b. the second signal input of the summing arrangement comprises a least significant bit input which is coupled to the output of the square-wave generator.

3. The signal processing arrangement of claim 1, wherein the comparator circuit produces at its output a trivalent signal whose value depends on a sign of a difference between signals applied to the first and second signal inputs of the comparator circuit, and on the value of the bit sequence produced by the square-wave signal generator.

4. The signal processing arrangement of claim 1 wherein:
   a. the comparator circuit includes:
      i. a single change-over switch including:
         A. a control input, coupled to the output of the square-wave signal generator, for controlling change-overs of the single change-over switch in response to the bit sequence;
         B. first and second switching contacts; and
         C. a master contact, associated with the first and second switching contacts, and coupled to the first signal input of the summing arrangement; and
      ii. a dual change-over switch including:
         A. a common control input, coupled to receive a differential signal which is representative of the difference between signals applied to the first and second inputs of the comparator circuit, the common control input being for controlling change-overs of the dual change-over switch;
         B. first and second master contacts, coupled respectively to the first and second switching contacts of the single change-over switch;
         C. first and second pairs of first and second switching contacts, each pair of first and second switching contacts being associated with a respective one of the first and second master contacts, the switching contacts of the dual change-over switch being for coupling to receive values "one", "zero", and "minus one", so that in a first position of the dual change-over switch, the first and second switching contacts of the single change-over switch receive signals having the values "one" and "zero" respectively and so that in a second position of the dual change-over switch, the first and second switching contacts of the single change-over switch receive the values "minus-one" and "zero" respectively.

5. An image processing device comprising a signal processing arrangement, the signal processing arrangement comprising:
   a. a comparator circuit having a first signal input for receiving an input signal, a second signal input, and an output, the second signal input having a a least significant bit input;
   b. a summing arrangement having a first signal input connected to the output of the comparator circuit and a second signal input;
   c. a pixel memory having an output connected to the second signal input of the summing arrangement and to the second signal input of the comparator circuit; and
   d. a square-wave generator having an output coupled to the summing arrangement and the least significant bit input of the second signal input of the comparator circuit, the square wave generator generating a bit sequence which represents the least significant bits of signals applied to the second signal input of the comparator circuit.

6. The image processing device of claim 5 wherein:
   a. the comparator circuit provides at its output a binary signal having a value which depends on a sign of a difference between the signals applied to the first and second signal inputs of the comparator circuit; and
   b. the second signal input of the summing arrangement comprises a least significant bit input which is coupled to the output of the square-wave generator.

7. The image processing device of claim 5, wherein the comparator circuit produces at its output a trivalent signal whose value depends on a sign of a difference between signals applied to the first and second signal inputs of the comparator circuit and on the value of the bit sequence produced by the square-wave signal generator.

8. The image processing device of claim 5 wherein:
   a. the comparator circuit includes:
      i. a single change-over switch including:
         A. a control input, coupled to the output of the square-wave signal generator, for controlling change-overs of the single change-over switch in response to the bit sequence;
         B. first and second switching contacts; and
         C. a master contact, associated with the first and second switching contacts of the single change-over switch, and coupled to the first signal input of the summing arrangement; and
      ii. a dual change-over switch including:
         A. a common control input, coupled to receive a differential signal which is representative of the difference between signals applied to the first and second inputs of the comparator circuit, the common control input being for controlling change-overs of the dual change-over switch;

B. first and second master contacts, coupled respectively to the first and second switching contacts of the single change-over switch;

C. first and second pairs of first and second switching contacts, each pair of first and second switching contacts being associated with a respective one of the first and second master contacts, the switching contacts of the dual change-over switch being for coupling to receive values "one", "zero", and "minus one", so that in a first position of the dual change-over switch, the first and second switching contacts of the single change-over switch receive signals having the values "one" and "zero" respectively and so that in a second position of the dual change-over switch, the first and second switching contacts of the single change-over switch receive the values "minus one" and "zero" respectively.

* * * * *